J. P. NIKONOW.

ELECTRIC SPOTLIGHT.

APPLICATION FILED AUG. 16, 1919.

Reissued May 10, 1921. 15,102.

*Inventor:*
*John P. Nikonow,*
*by Emery, Booth, Janney & Varney*
*Attys.*

UNITED STATES PATENT OFFICE.

JOHN P. NIKONOW, OF NEW YORK, N. Y., ASSIGNOR, BY MESNE ASSIGNMENTS, TO THE HAWTHORNE COMPANY, OF BRIDGEPORT, CONNECTICUT, A CORPORATION OF CONNECTICUT.

ELECTRIC SPOTLIGHT.

15,102. Specification of Reissued Letters Patent. Reissued May 10, 1921.

Original No. 1,300,454, dated April 15, 1919, Serial No. 246,290, filed July 23, 1918. Application for reissue filed August 16, 1919. Serial No. 318,059.

*To all whom it may concern:*

Be it known that I, JOHN P. NIKONOW, a Russian citizen, and resident of the city, county, and State of New York, have invented a new and useful Improvement in Electric Spotlights, of which the following is a specification.

My invention relates to the electric lamps for vehicles, such as automobiles, etc., commonly known as "spotlights," which are mounted on a swivel or flexible joint within reach of the driver, so that he can turn it in any direction on the road. My invention has a special reference to such lamps, as embody a combination of a spotlight and a trouble lamp, the lamp itself being removable from the housing and supplied with a long cord or leads, so as to enable its use around the vehicle at night. The further object of my invention is to provide a mechanism of the character above designated, which would be neat and attractive in appearance, like ordinary spotlights, and at the same time would be always ready for use as a portable or trouble lamp.

My invention is explained more fully in the accompanying description and drawing, in which:—

Figure 1:
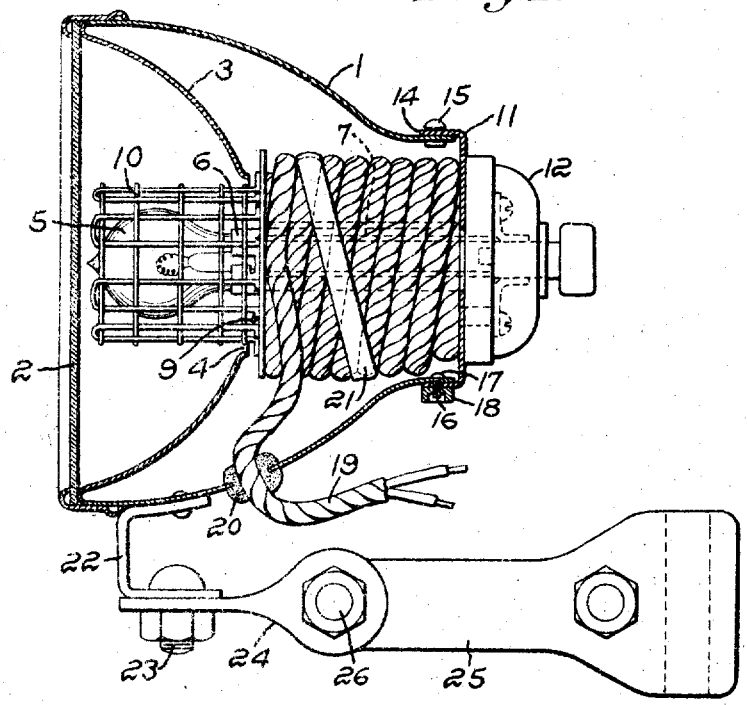

Figure 1 represents a sectional elevation of my lamp fully assembled, and

Figure 2:
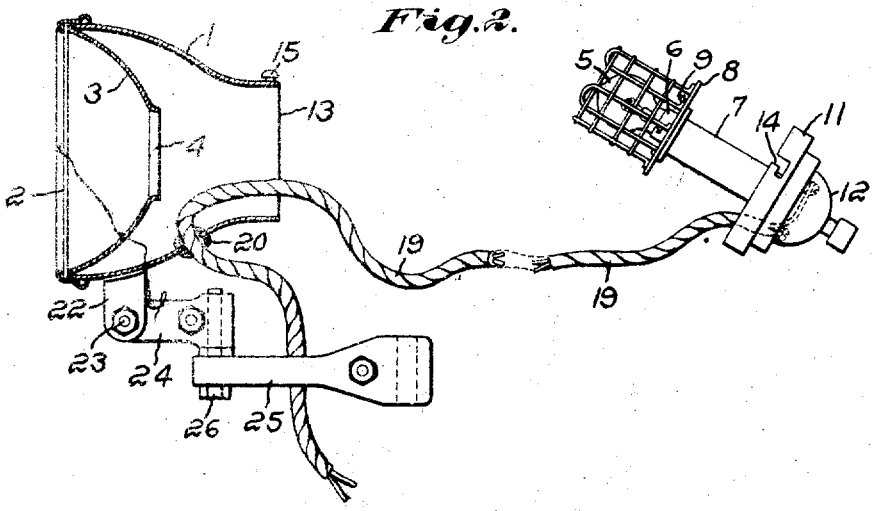

Fig. 2—the same, with the lamp removed and cord unwound.

My invention consists of a housing 1 with a glass 2 in front and reflector 3 inside. This reflector has an opening 4, adapted to receive an electric lamp 5 with a wire protector 10. This lamp fits into a socket 6, mounted on a tube 7, supporting also a shield 8 with a portion of the reflector 9, just back of the lamp, and a wire screen protector 10. The other end of the tube 7 supports a cap 11 and an electric switch 12, which may be of any commercial type. The cap 11 is adapted to fit over the open end 13 of the housing 1. Some suitable locking device may be used to prevent the cap from sliding off, such as shown in the drawings, and consisting of a two way recess 14, adapted to engage the button 15 on the housing. An additional locking device may be provided, consisting of a set screw 16, attached to the cap 11 and fitting in a recess 17 in the housing 1. The set screw is placed in a cup shaped nut 18, so that it can be operated only with a special socket wrench or key.

The cord 19, consisting of two insulated wires, twisted together, is connected to the switch 12 on one end, passes through the bushing 20 and extends farther to be connected to the source of the electric current, such as an electric battery (not shown). Between the switch 12 and bushing 20 sufficient length should be allowed to enable the use of the lamp around the vehicle, when the cord is unwound. When it is desired to assemble the lamp again, the cord 19 should be wound around the tube 7, as shown in Fig. 1. A rubber band 21 may be employed to hold the turns together, after which the lamp is inserted in the housing, and cap 11 fitted on its place, as shown.

The housing 1 has a bracket 22, connected with a bolt 23 to a link 24, which in turn is connected to the bracket 25, adapted to be attached to some part of the vehicle near the driver, for instance, to the windshield of an automobile. The bolts 23 and 26 are tightened with enough tension to allow the lamp to be set in any position desired.

Important advantages of my spotlamp are, that it can be used as an ordinary lamp or spotlight, being well protected all around from the atmospheric influence and being adapted to be moved and set in any position desired, having at the same time all the practical features of an ordinary portable or trouble lamp, being always ready for such use.

I claim as my invention:—

1. In an electric spotlight, the combination with a housing, supporting bracket for said housing, a reflector, formed of two portions, front portion being fastened to the front end of said housing, and the rear portion being removable, an electric lamp attached to said removable portion, a protector for said lamp, attached to said removable portion, a supporting stem for said lamp, attached to said removable portion, and adapted to engage the rear end of said housing, said lamp with said protector and rear portion adapted to pass freely through the opening in said front portion of said reflector, and a means to conduct electric current to said lamp in its attached and detached positions.

2. In an electric spotlight, the combination with a housing, supporting bracket for said housing, a reflector, formed of two portions, front portion being fastened to the front end of said housing, an electric lamp, a supporting stem for said lamp having an enlarged portion, rear portion of said reflector, attached to said supporting stem, the enlarged portion on said supporting stem adapted to engage the rear end of said housing, a protector for said lamp attached to said stem, and adapted to pass freely through the opening in said front portion of said reflector, said stem with said parts attached being adapted to be used as a trouble lamp, when detached from said housing, and means to conduct electric current to said lamp in its detached and inserted positions.

3. In an electric spotlight, the combination with a housing, a reflector inside of said housing, an opening in said reflector, a lamp, adapted to be moved in and out of said reflector through said opening, a supporting member for said lamp, detachably connected with said housing, flexible electric conductors in coöperation with said lamp and said housing, adapted to be supported by said supporting means, when said lamp is placed inside of said reflector.

4. In an electric spotlight, the combination with a housing, a reflector inside of said housing, an opening in said reflector, a lamp, adapted to be moved in and out of said reflector through said opening, supporting member for said lamp, detachably connected with said housing, flexible electric conductors in coöperation with said lamp and said housing, said conductors being adapted to be wound around said lamp supporting member and to be placed inside of said housing, when said lamp is placed inside of said reflector.

5. A lamp having a body comprising an exterior housing and an interior reflector defining a space between them, a light normally positioned in front of the reflector, a carrier therefor extending through reflector and housing, the carrier and light being withdrawable rearwardly as a unit from the lamp body, and a conductor entering laterally into said housing and terminally connected to said carrier with intervening slack normally housed in said space.

6. A lamp having a body comprising an exterior housing and an interior reflector defining a space between them, a light normally positioned in front of the reflector, a carrier therefor extending rearwardly across said space and through the housing and providing a portion normally presented exteriorly at the rear of the housing, the carrier and light being withdrawable rearwardly as a unit from the lamp body, and a conductor entering laterally into said housing and terminally connected to said carrier with intervening slack normally housed in said space.

7. A lamp having a body comprising an exterior housing and an interior reflector defining a space between them. a light normally positioned in front of the reflector, a carrier therefor extending through reflector and housing, the carrier and light being withdrawable rearwardly as a unit from the lamp body, and a conductor entering laterally into said housing and terminally connected to said carrier with intervening slack normally housed in said space, the body of said carrier forming a reel on which the slack may be wound.

8. A lamp having a body comprising an exterior housing and an interior reflector defining a space between them, an electric conductor entering through the housing to said space, a light normally positioned in front of the reflector, a socket for receiving the light, a reel organized about said socket for normally storing slack of said conductor in said space, a portion at the exterior of the housing connected to said socket and providing means for withdrawing the light rearwardly from the lamp body.

9. Lighting apparatus comprising a support or bracket, a lamp structure sustained thereby and including a reflector, a light normally positioned in front of the reflector, an element presented at the rear of the lamp structure and providing a handle whereby said light may be withdrawn rearwardly from said reflector, a conductor leading to said light and laterally connected thereto to leave said handle unobstructed thereby and a reel for storing slack of said conductor intervening between its point of connection and said support.

10. A lamp having a body comprising an exterior housing and an interior reflector defining a space between them, an electric conductor entering through the housing to said space, a light normally positioned in front of the reflector adapted to be energized through said conductor, a reel normally received in said space for storing slack of the conductor and a portion normally presented exteriorly at the rear of the housing providing means for withdrawing the light rearwardly from in front of the reflector across said space and separating it from the lamp body as permitted by the unwinding of slack from the reel.

11. A lamp having a body comprising an exterior housing and an interior reflector defining a space between them, a light normally positioned in front of the reflector, a reel housed in said space, a portion presented exteriorly at the rear of the housing providing means for withdrawing the light rearwardly from in front of the reflector across said space and separating it from the lamp body and a conductor entering said space at a location remote from the handle having slack stored on said reel and terminally electrically connected to said light.

12. A lamp as defined in claim 11 wherein resilient means is provided for holding the conductor wound on the reel.

In testimony that I claim the foregoing as my own, I have hereto affixed my signature.

JOHN P. NIKONOW.